Dec. 4, 1951     C. L. POGANSKI     2,577,360
IMPLEMENT FOR USE IN TRIMMING CHRISTMAS TREES WITH TINSEL
Filed March 31, 1950
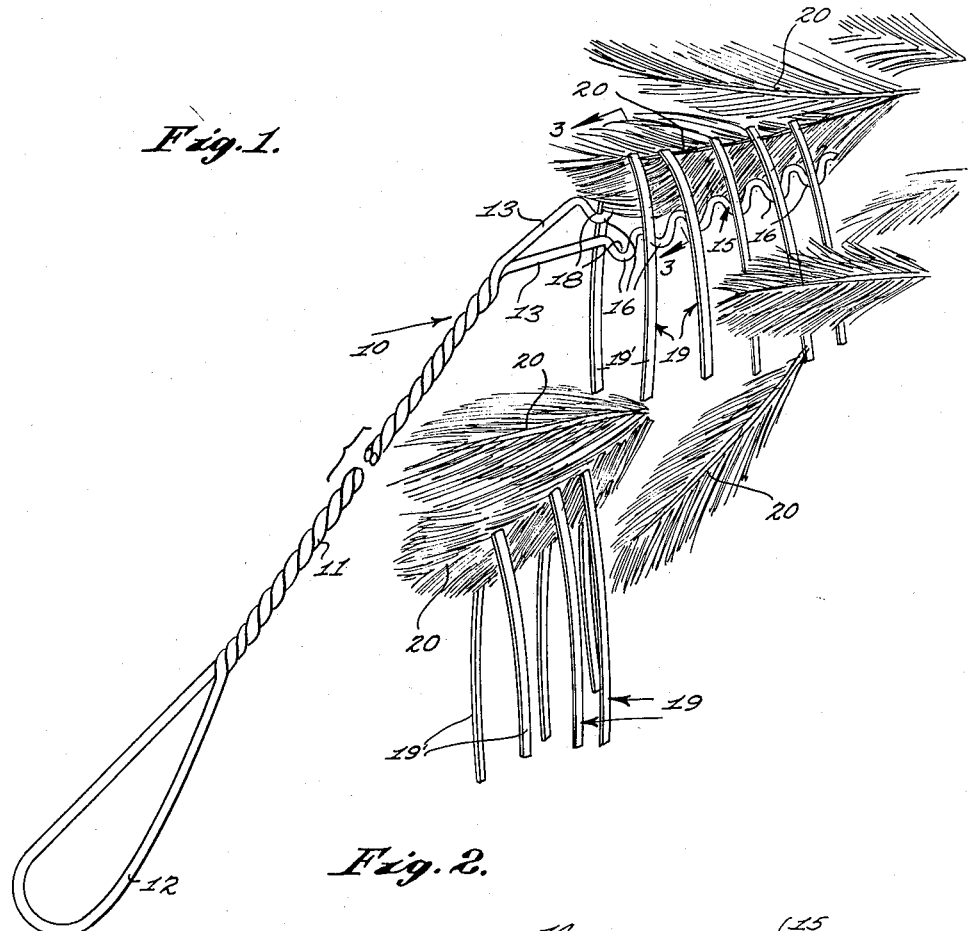
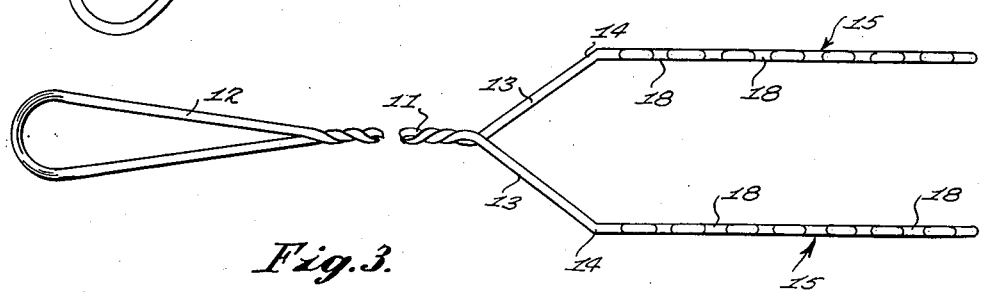
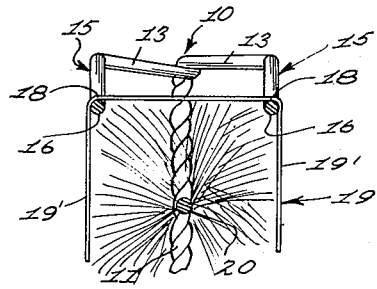
INVENTOR.
CHARLES L. POGANSKI
BY
McMorrow, Berman + Davidson
ATTORNEYS Patented Dec. 4, 1951

2,577,360

UNITED STATES PATENT OFFICE 2,577,360

IMPLEMENT FOR USE IN TRIMMING CHRISTMAS TREES WITH TINSEL

Charles L. Poganski, St. Cloud, Minn.

Application March 31, 1950, Serial No. 153,172

2 Claims. (Cl. 294—5.5)

My invention relates to a Christmas tree trimming implement.

A primary object of the invention is to provide a highly simplified hand implement to facilitate trimming Christmas trees with strands of decorative foil or tinsel.

A further object of the invention is to provide an implement of the above-mentioned character which will enable the entire Christmas tree to be trimmed in a relatively short time by a person standing on the floor, the implement entirely eliminating the necessity of standing on a stepladder, chair or the like while hanging the tinsel upon the tree.

A further object is to provide a tinsel-hanging implement constructed so that the tinsel may be applied to all portions of the Christmas tree in a neat, orderly and extremely attractive manner, rather than the usual haphazard manner in which the tinsel is generally hung and sometimes thrown upon the Christmas tree.

A still further object of the invention is to provide an implement of the above-mentioned character which is highly simplified, long lasting and inexpensive to manufacture.

Other objects and advantages of the invention will be apparent during the course of the following description.

In the accompanying drawings forming a part of this application, and in which like numerals are employed to designate like parts throughout the same:

Figure 1 is a perspective view of a Christmas tree trimming implement embodying my invention and illustrating the use of the same for applying tinsel to the branches of a Christmas tree, part broken away;

Figure 2 is a plan view of the implement illustrated in Figure 1, part broken away; and Figure 3 is a transverse, generally vertical, sectional view taken on line 3—3 of Figure 1.

In the drawings, where, for the purpose of illustration, is shown a preferred embodiment of the invention, the numeral 10 designates generally my Christmas tree implement, which comprises an elongated, straight rod or shank 11, preferably formed from a single section or strand of heavy wire twisted upon itself in the manner shown. The wire employed in the formation of the implement may be of a gauge similar to that generally used in making conventional wire coat hangers. The rod or shank 11 may be constructed in any desired length, and it is preferably long enough so that a seven or eight-foot Christmas tree may be readily trimmed with tinsel by a person standing upon the floor.

At the bottom end of the straight rod or shank 11, the single wire strand may be formed into an open loop 12 integrally connected with the rod 11, as shown, and adapted to serve as a handle. At the top end of the straight rod 11, the twisted wire strand or section is separated for forming a pair of opposed, short, straight, diverging extensions or arms 13 integral with the rod or shank 11 and arranged at a slight angle or inclination with respect to the longitudinal axis of the straight rod 11, as shown.

The wire strand which forms the implement 10 is further bent at the top or spaced ends of the extensions 13, as at 14, to form laterally spaced, parallel, elongated, tines or support arms 15 integrally secured to the extensions 13 and arranged at the same angle with respect to the straight rod 11 as the extensions 13. The support arms or tines 15 extend generally longitudinally of the rod or shank 11, but are arranged at the slight angle with respect to the axis of the rod to facilitate hanging or applying tinsel to the Christmas tree, as will be fully described.

The laterally spaced, parallel support arms 15 are vertically bent or crimped to form longitudinally spaced, substantially U-shaped, vertical extensions 16 forming longitudinally spaced depressions or corrugations 18 for receiving flexible strands of ornamental foil or tinsel 19. The U-shaped extensions 16 of each support arm 15 are disposed in the same vertical plane, Figures 2 and 3, and the extensions 16 and depressions 18 of the two support arms 15 are in transverse or lateral alignment, Figure 2. Obviously, the support arms 15 may be made any desired length, and the support arms may be crimped to form any desired number of the U-shaped extensions 16. I prefer to make the support arms 15 long enough to conveniently form about six of the U-shaped extensions 16 forming the depressions or corrugations 18. With this arrangement, six of the tinsel strands 19 may be handled simultaneously, and I have found that this is a convenient number of strands to manipulate simultaneously. However, as many tinsel strands 19 as desired may be handled simultaneously by making the support arms 15 longer and crimping them to provide additional U-shaped extensions 16.

The use of the implement for trimming a Christmas tree with tinsel is as follows:

A desired number of the tinsel strands 19 are draped or hung over the pair of support arms 15 in the manner clearly shown in Figure 3, each tinsel strand 19 engaging in a pair of the laterally oppositely disposed depressions 18, as shown. In this manner, the separate tinsel strands 19 have their opposite, depending side sections 19' spaced apart laterally for a substantial distance while the tinsel is being supported by the implement. As shown in Figure 3, the tinsel strands 19 assume substantially inverted U-shapes.

The implement 10 is now extended upwardly, the user grasping the handle 12, and the tines or support arms 15 are brought into position above a selected twig or shoot 20 of one of the Christmas tree branches. The support arms 15 carrying the tinsel strands 19 are now lowered, and the side sections 19' of the tinsel strands will readily engage over or straddle a particular twig 20 of the Christmas tree branch, as shown. When the tinsel strands 19 thus engage over the twig 20, the support arms 15 are further lowered until they disengage the tinsel strands which are left suspended from and supported by the twig 20.

In this manner, an entire Christmas tree may be trimmed with tinsel in a very short time and with a minimum of work. The rod 11 is long enough so that it is never necessary to stand on a ladder, chair or the like to reach the high points of the Christmas tree. Since the depressions 18 are spaced longitudinally equidistantly along the support arms 15, the tinsel strands 19 will likewise be equidistantly spaced in a very uniform and attractive manner when applied to the Christmas tree, as shown. As previously stated, the use of my implement 10 entirely overcomes and eliminates the haphazard and unattractive manner in which Christmas trees are generally trimmed with tinsel.

If desired, the implement may also be employed for removing tinsel from the Christmas tree. To do this, the support arms 15 are turned so that one arm is arranged above the other and the arms are then inserted between the depending side sections 19'. The support arms 15 are then turned again until they are substantially laterally oppositely disposed in a substantially horizontal plane and lifted vertically upwardly. When this is done, the tinsel strands 19 will find their way into the depressions 18, and the strands are readily lifted from the twigs 20.

While I have shown and described the implement 10 as formed from a single section or strand of wire, it should be understood that any other suitable material, such as some plastic material, may be employed for making the implement. Also, if desired, the rod or shank 11 may be formed of wood or plastic material, and the support arms 15 may be secured to the rod or handle thus formed in any conventional manner.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described my invention, I claim:

1. In an implement for laying tinsel strands on a branch of a Christmas tree, an elongated rod having a pair of longitudinally elongated, laterally spaced tines on one end, said tines being positioned in a plane disposed at an angle to said rod whereby when the rod is reached upwardly at an angle the tines can be in a horizontal plane with tinsel strands laid crosswise across the tines, said tines being laterally spaced from each other to occupy positions along opposite sides of a Christmas tree branch with end portions of the strands depending from the outer sides of the tines, said tines being formed with longitudinally spaced upwardly opening depressions in which the tinsel strands are adapted to rest so as to be spaced from each other along the tines, said tines being arranged to be lowered by means of said rod with the tines at opposite sides of the branch so as to lay the portions of the tinsel strands between the tines onto the branch and further lowered to disengage the tines from the tinsel strands and leave the tinsel strands straddling the branch.

2. In an implement for laying tinsel strands on a branch of a Christmas tree, an elongated rod having a pair of longitudinally elongated, laterally spaced tines on one end, said tines being positioned in a plane disposed at an angle to said rod whereby when the rod is reached upwardly at an angle the tines can be in a horizontal plane with tinsel strands laid crosswise across the tines, said tines being laterally spaced from each other to occupy positions along opposite sides of a Christmas tree branch with end portions of the strands depending from the outer sides of the tines, said tines being formed with longitudinally spaced upwardly opening depressions in which the tinsel strands are adapted to rest so as to be spaced from each other along the tines, said tines being arranged to be lowered by means of said rod with the tines at opposite sides of the branch so as to lay the portions of the tinsel strands between the tines onto the branch and further lowered to disengage the tines from the tinsel strands and leave the tinsel strands straddling the branch, said tines being straight throughout their length and in parallel relation, said tines being longitudinally crimped to define depressed portions constituting said depressions and elevated portions separating adjacent depressions.

CHARLES L. POGANSKI.

REFERENCES CITED

The following references are of record in the file of this patent:

UNITED STATES PATENTS

| Number | Name | Date |
|---|---|---|
| 747,986 | Layne | Dec. 29, 1903 |
| 901,671 | Bennett | Oct. 20, 1908 |
| 2,439,115 | Viviano | Apr. 6, 1948 |